(12) United States Patent
Muth

(10) Patent No.: US 7,046,722 B2
(45) Date of Patent: May 16, 2006

(54) TRANSCEIVER WITH MEANS FOR ERROR MANAGEMENT

(75) Inventor: Matthias Muth, Stelle (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 829 days.

(21) Appl. No.: 10/055,387

(22) Filed: Jan. 23, 2002

(65) Prior Publication Data

US 2002/0097789 A1 Jul. 25, 2002

(30) Foreign Application Priority Data

Jan. 24, 2001 (DE) ................. 101 03 092

(51) Int. Cl.
*H04B 1/38* (2006.01)
(52) U.S. Cl. .................................. 375/219
(58) Field of Classification Search ............. 375/219, 375/220; 370/445, 431, 433
See application file for complete search history.

(56) References Cited

U.S. PATENT DOCUMENTS 5,781,585 A 7/1998 Roland et al.

FOREIGN PATENT DOCUMENTS

DE 196 11 942 10/1997

OTHER PUBLICATIONS

Philips Semiconductors: "Data Sheet: TJA1050 High Speed Can Transceiver" Preliminary Specification, Online Jan. 10, 2006, URL: http://www.semiconductors.philips.com/acrobat_download/datasheets/TJA1050_4.pdf.
Philips Semiconductors: "Data Sheet: TJA1054 Fault-Tolerant Can Transceiver" Preliminary Specification, Online Jan. 10, 2006, URL: http://www.semiconductors.philips.com/acrobat_download/datasheets/TJA1054_3.pdf.

*Primary Examiner*—Robert Pascal
*Assistant Examiner*—Krista M. Flanagan
(74) *Attorney, Agent, or Firm*—Adam L. Stroud

(57) ABSTRACT

A transceiver for a serial data bus is provided which transceiver includes error management. In a first example embodiment of a transceiver, error management is provided which supplies an error signal when the data bus lines are active and the receiving line simultaneously is inactive. In a second example embodiment of a transceiver, error management is provided which triggers an error signal when the transmission line is active for a longer period than a predetermined time interval, which error signal is cancelled when both the transmission line is inactive and the receiving line is active.

20 Claims, 1 Drawing Sheet

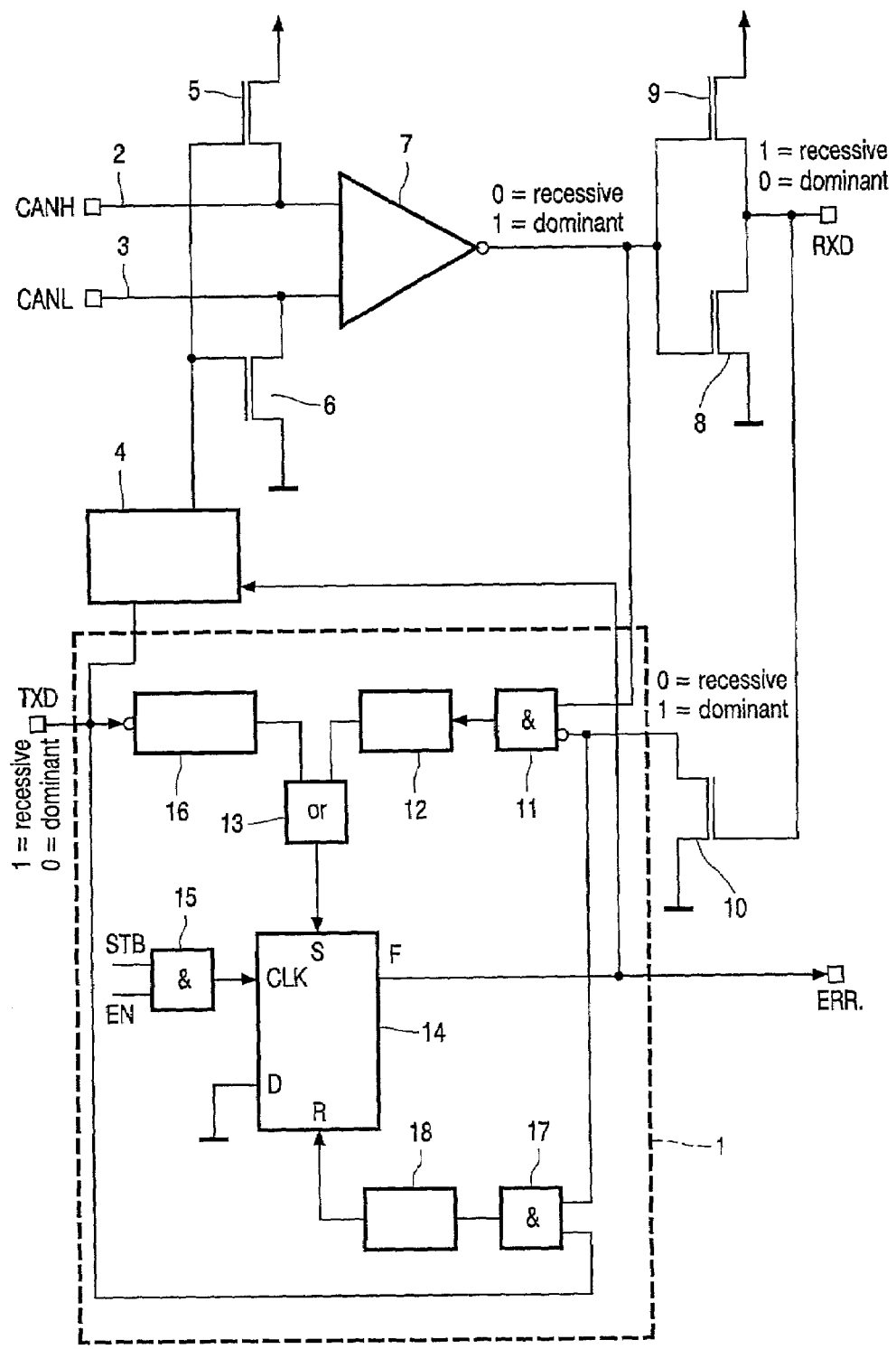

TRANSCEIVER WITH MEANS FOR ERROR MANAGEMENT

The invention relates to a transceiver for a serial data bus, in which the transceiver is connected via a transmission line and a receiving line to a protocol controller which manages the protocol of the data bus. The transceiver is also coupled to the lines of the data bus. Moreover, the transceiver comprises means for error management.

In many serial bus systems, the components for the protocol processing, i.e. the protocol controller, and the eventually required line drivers, which are provided in the transceiver, are realized separately. This has the advantage that the same protocol controller can be used, for example, when choosing other media such as copper cables or optical lines; only the transceiver must be adapted accordingly.

As a consequence of the separation of the protocol controller and the transceiver, information between the two must be exchanged via an interface. To this end, a transmission line is provided by means of which the protocol controller informs the transceiver that a writing process should be performed on the bus. Conversely, the transceiver on a receiving line signals that it has received data on the bus. Such a construction is provided, for example, in many transceivers and protocol controllers for the controller area network (CAN) bus which is particularly used in vehicles.

It is exactly for such uses that the availability of a bus system is important. Various methods of improving the reliability of the bus system are known.

On the physical side, i.e. for the above-mentioned connection between the protocol controller and the transceiver, the transmission line and/or the receiving line may be disturbed. The communication between these two components or even in the bus system is then disturbed so that the bus system may be paralyzed.

In some Philips transceivers which are realized in integrated circuits and have type numbers TJA 1050 and TJA 1054, precautions have been taken to prevent that the transceiver is permanently active, for example, because the transmission line is clamped to the active state. In practice, a permanently active transmission line can only be caused by an error because a dominant transmission time can usually only be limited so that edges occur. However, when the transmission line is permanently active, a short-circuit may be the conclusion. In this case, a timer is started in the above-mentioned IC types, which timer monitors the active state of the transmission line and switches off the driver output of the transceiver after a predetermined period of time. As soon as the transmission line reassumes the "non-active" state, the driver output becomes active again in this solution and the timer is reset.

This prior art solution may only be sufficient for the erroneous situation when the transmission line is clamped to a permanently active state. However, further errors may occur on the receiving line and/or the transmission line, which errors are not covered by such a solution.

It is therefore an object of the invention to provide a transceiver which can also cover other error conditions, particularly of the receiving line between the transceiver and the protocol controller and can prevent blocking of the data bus in such an erroneous situation.

For a first embodiment of the invention, this object is solved by the following characteristic features of claim 1.

A transceiver for a serial data bus, in which the transceiver is connected via a transmission line and a receiving line to a protocol controller which manages a data bus protocol, and is coupled to the lines of the data bus, and in which the transceiver comprises means for error management which supply an error signal when they recognize that the data bus lines are active and when the receiving line simultaneously signals an inactive bus, said error signal having the effect that the transceiver no longer acts actively on the data bus.

This first embodiment of the invention provides a solution for the erroneous situation when the receiving line (RXD) is permanently clamped to the inactive state. In such a case, the protocol controller would start transmitting to the data bus at arbitrary instants, assuming that the bus is free. Possible transmissions on the data bus are thereby eliminated and the availability of the bus system is limited until complete rejection. To avoid this, means for error management are provided in transceiver in accordance with the first embodiment of the invention. These means check whether data bus lines are simultaneously active and whether the receiving line signals an inactive bus. This would exactly be the erroneous situation described above, in which the data line is clamped to the inactive state but in which actually the data bus is active. In this case, the means for error management according to the invention prevent the data bus from being used by the protocol controller or the transceiver, in that the means for error management supply an error signal which has the effect that the transceiver no longer acts actively on the data bus, thus sends no dominant bits to the data bus. It is thereby ensured for the erroneous situation described above that, due to inactive clamping of the receiving line, the transceiver or the protocol controller can no longer transmit data to the bus and thus do not destroy data communication which is taking place on the bus. It is particularly advantageous that the error state is already recognized before the communication on the bus is affected.

The above-mentioned object is solved in a second embodiment of the invention by the following characteristic features of claim 2.

A transceiver for a serial data bus, in which the transceiver is connected via a transmission line and a receiving line to a protocol controller which manages a data bus protocol, and is coupled to the lines of the data bus, and in which the transceiver comprises means for error management, which means comprise a timer circuit which triggers an error signal when the transmission line is active for a longer period than a predetermined time interval, said error signal having the effect that the transceiver no longer acts actively on the data bus, which error signal is cancelled only when the transmission line signals an inactive bus and the receiving line signals an active bus.

A further possible cause of errors of the type described above may be that the receiving line is clamped to the transmission line, i.e. there is a short-circuit between the two. Furthermore, it is possible that the transmission line is permanently clamped to the active state.

In both cases, the transmission line is permanently active so that the bus is disturbed. When the transmission line is active, this effect will occur immediately. When the receiving line and the transmission line are coupled together (short-circuited) a feedback takes place as soon as an arbitrary participant starts transmitting because the current bus state is fed back to the receiving line and is further held active via this feedback from the receiving line to the transmission line.

In accordance with the second embodiment of the invention, this problem is solved in that the transceiver according to the invention comprises means for error management, which means trigger an error signal when the transmission line is active for a longer period than a predetermined time interval, said error signal having the effect that the transceiver no longer acts actively on the data bus. In contrast to the state of the art, this error signal is, however, not cancelled in dependence upon time but persists until the transmission line signals an inactive bus and the receiving line signals an active bus.

This condition for canceling the erroneous state is essential because in accordance with the state of the art the bus is released again after the erroneous state has been recognized. However, in this solution, the timer is also reset because the problem has been eliminated again. The next transmission attempt subsequently taking place on the data bus restarts this cycle again in the prior art solution. However, the actual problem, namely the disturbance of the data bus, is not eliminated thereby.

In the solution according to the invention, it is ensured that the error signal is not cancelled until after it is certain that the erroneous state has been eliminated. This is the case when, on the one hand, the receiving line signals an active bus but, onto other hand, the transmission line is inactive.

In accordance with an embodiment of the invention for the first embodiment as defined in claim 3, the error signal is switched off when the receiving line signals an active bus. In this case it is ensured that clamping of the receiving line to the inactive state is cancelled and that the disturbance is eliminated.

To ensure in a simple but reliable way that transmission by the transceiver, controlled by the protocol controller, is excluded in an erroneous case, a further embodiment which is common for both embodiments of the invention as defined in claim 4 is characterized in that a bus transmission state in the transceiver is switched to the inactive state when an error signal occurs. Active influence on the bus is thereby excluded. As is also common for both embodiments, a further embodiment of the invention as defined in claim 5 is characterized in that the error signal is signaled to the exterior via an error line. This is particularly advantageous for signaling the erroneous state to the protocol controller in order that this controller does not attempt further transmissions, and for the purpose of informing an application about the erroneous bus state.

The erroneous state can only be cancelled when at least one bus participant transmits actively again so that the expected signals occur on the transmission and receiving lines. When no further participant is present in the system at the instant of eliminating the error, the node disturbed so far nevertheless remains in the erroneous state in spite of the error elimination. To lift this erroneous state, both embodiments of the invention provide a control line as defined in claim 6, whose activation resets the means for error management in the transceiver and thus switches the error signal to the inactive state. The erroneous state can thus also be reset via and under the control of the transmission line, also in the erroneous situation.

These and other aspects of the invention are apparent from and will be elucidated with reference to the embodiments described hereinafter.

In the drawings:

The greater part of the sole FIGURE is a block diagram of a transceiver according to the invention for a serial data bus with means 1 for error management.

The embodiment shown in the FIGURE is a CAN data bus which is often used in vehicles and is a two-wire bus on which dominant bits are differentially transmitted.

To this end, a first data bus line 2 is provided which is denoted by CAN H, and a second data bus line 3 which is denoted by CAN L. When a bit is transmitted on the data bus lines, the potential of the first data bus line 2 is increased and the potential of the second data bus line 3 is decreased.

The transceiver shown in the FIGURE comprises a transmitter 4 controlling a first bus transmission stage 5 and a second bus transmission stage 6. The first bus transmission stage 5 is coupled to a positive reference potential and the second bus transmission stage 6 is coupled to the reference potential. In the case where an active bit is to be transmitted, the transmitter 4 controls the two transmission stages 5 and 6 so that the corresponding potential shifts are performed on the two bus lines 2 and 3. To this end, the transmitter 4 is controlled in a corresponding manner by a protocol controller, not shown in the FIGURE, via a transmission line TXD.

This protocol controller (not shown) controls the transmission and the reception on the data bus in conformity with the data bus protocol. The transceiver shown in the FIGURE is thus eventually controlled by this protocol controller.

The block diagram in the FIGURE further shows a differential amplifier 7 whose inverting output in state 0 signals when the data bus, i.e. the two data bus lines 2 and 3, is recessive. However, when the differential amplifier 7 supplies a signal with a high level, it signals that a dominant bit is transmitted on the data bus. This signal is signaled on a receiving line RXD via a push-pull driver stage comprising two transistors 8 and 9. This receiving line is particularly evaluated by the protocol controller (not shown). The protocol controller thus knows at any time via the signal received on the receiving line RXD which processes take place on the data bus and on data bus lines 2 and 3.

Such a data bus system may be provided, for example, in a motor vehicle. In such an environment, it is particularly appreciated when errors existing particularly in short-circuits of the lines disturb the data bus communication to a minimal extent. For errors on the data bus lines 2 and 3 themselves, many solutions are known from the prior art. In the solution shown in the FIGURE, in which the transceiver in the FIGURE and the protocol controller are constructed separately, a disturbance of operation may additionally occur because one of the two lines between them, namely either the receiving line or the transmission line is disturbed, for example, because there is a short-circuit between the two or because one of the two lines is clamped to a fixed state.

The fact that the receiving line RXD is permanently clamped to the inactive state may be such an error. In this case, the protocol controller would assume that the data bus is free and would attempt to transmit. However, when data communication already takes place simultaneously on the data bus, this would be severely disturbed and might lead to complete interruption of the data communication. To recognize this erroneous case, a first embodiment of the invention is characterized in that an error signal is generated when the means 1 for error management recognize that the data bus lines are active but the receiving line RXD simultaneously signals an inactive bus. This case would occur, for example, when the receiving line is clamped to the inactive state.

To cancel this erroneous condition, the means 1 for error management comprises a first AND gate 11 whose first non-inverting input is coupled to the output of the differential amplifier 7. The signal of the receiving line RXD is applied to a second inverting input of the first AND gate 11, which signal is coupled out of the receiving line by means of a transistor stage 10 and is inverted.

The first AND gate 11 precedes a filter 12 which is a time filter and takes into account the delay times and recharge times up to the RXD pin. This time filter suppresses the output signal of the AND gate 11 during given periods of time in which it should be taken into account that an erroneous output signal of the AND gate 11 occurs due to different delay times of the two signals applied to the AND gate 11.

The output signal of the time filter 12 is applied to a D flip-flop 14 via an OR gate 13. This signal is applied to a set input S of the D flip-flop. An output of the D flip-flop supplies an error signal F. This error signal F is applied to the transmitter 4 and is signaled on external components via an en-or line ERR, for example, on the above-mentioned protocol controller (not shown).

The D flip-flop 14 further has a clock input CLK which receives the output signal from a third AND gate 15 which is controlled by means of two signals STB and EN. When the two signals have this high level, the clock input of the flip-flop 14 is controlled via the corresponding output signal of the third AND gate 15 so that the flip-flop 14 can be reset in this way. This may be done to perform a reset, also in the erroneous case, i.e. when the D flip-flop itself is set. This may be advantageous for trial purposes or emergency purposes.

The D input of the flip-flop 14 is coupled to the reference potential.

This circuitry of the means 1 for error management covers the case where the data bus lines are active but where the receiving line simultaneously signals signalizes an inactive data bus. This case may occur, for example because the receiving line is clamped to the inactive state. In this erroneous case, the first AND gate 11 would supply a corresponding output signal which would have the result that the D flip-flop would be set via the filter 12 and the OR gate 13. When the D flip-flop 14 is set, it supplies an error signal which has the effect that an erroneous case is signaled to the transmitter 4. In this case, the transmitter 4 switches the transmission stages 5 and 6 to the inactive state so that data communication that may be taking place between other participants on the data bus lines 2 and 3 is not disturbed. Furthermore, this error signal is signaled to the protocol controller (not shown) via the error line ERR, so that this controller does not undertake any further transmission attempts.

Another possible erroneous case may occur when the transmission line TXD is permanently clamped to the active state or when the transmission line TXD is clamped with the receiving line RXD, so that there is a short-circuit between the two.

To cover this erroneous case, the second embodiment of the invention provides a timer circuit 16 which generates an output signal when the transmission line TXD is active for a longer period than a predetermined time interval, which output signal will also cause the D flip-flop to be set via the OR gate 13. Consequently, a permanently active state of the transmission line TXD during a predetermined time interval is recognized in this way, and the error signal F is generated under this condition. Such a permanently active state of the transmission line TXD during a predetermined time interval should not occur in accordance with the data bus protocol, because an inactive state of the data bus within certain minimal time intervals is ensured by this protocol. Under this condition, it must thus be an error with which the error signal F is triggered by the means 1 for error management.

The embodiment of the invention shown in the FIGURE thus advantageously combines both embodiments of the invention in that a common D flip-flop is provided for both embodiments, which flip-flop is controlled under the respective error conditions. In the embodiment shown in the FIGURE, the error signal F is jointly cancelled for both embodiments of the invention.

As a condition for canceling, it is assumed that all of the above-mentioned errors are assumed to be eliminated when the transmission line TXD is inactive and the receiving line is active. In such a case, for example, a receiving line which may be clamped to the inactive state should be free again. Furthermore, a short-circuit between the transmission line and the receiving line should be eliminated. The transmission line may neither be permanently clamped to the active state.

To cancel the error signal, a second AND gate 17 is provided whose first input receives the output signal of the transistor stage 10. The inverted signal of the receiving line RXD is thus applied to this input. The signal of the transmission line TXD is applied to the second input of the AND gate 17.

The second AND gate 17 supplies an output signal when the transmission line is inactive and the receiving line is active. In this case, the signal is again applied to a reset input of the D flip-flop 14 via a filter 18 for the purpose of compensating delay times. The D flip flop 14 is thus reset again under the above-mentioned condition so that the error signal F is switched to the inactive state again. This is signaled to the protocol controller via the error line ERR. Simultaneously, the transmitter 4 will switch the driver stages 5 and 6 to the active state again in so far as a corresponding transmission takes place through line TXD.

The transceiver shown in the FIGURE thus comprises means 1 for error management covering three essential error conditions. The circuit shown in the embodiment covers both embodiments of the invention, which is effected with a relatively small number of components because a common D flip-flop 14 for generating the error signal is provided in both embodiments of the invention. Also the resetting of the error signal is generated by circuit elements which are commonly provided for both embodiments.

In contrast to the solutions of the prior art, a reliable and wider error recognition on the two lines between the transceiver and the protocol controller is thus achieved. With a relatively small number of components, the reliability of the operation of the data bus is thereby substantially improved because the possible error conditions occurring in reality are covered and an undisturbed data communication with other participants on the data bus lines 2 and 3 can take place on the data bus, even when the receiving and/or transmission lines are disturbed.

The invention claimed is:

1. A transceiver for a serial data bus, in which the transceiver is connected via a transmission line and a receiving line to a protocol controller, which manages a data bus protocol and which is coupled to the lines of the data bus, and in which the transceiver comprises means for error management which means supplies an error signal when it recognizes that the data bus lines are active and that the receiving line simultaneously signals an inactive bus.

2. A transceiver for a serial data bus, in which the transceiver is connected via a transmission line and a receiving line to a protocol controller which manages a data bus protocol, and is coupled to the lines of the data bus, and in which the transceiver comprises means for error management, which means comprise a timer circuit which triggers an error signal when the transmission line is active for a longer period than a predetermined time interval, which error signal is cancelled when both the transmission line is inactive and the receiving line is active.

3. A transceiver as claimed in claim 1, characterized in that the means for error management switch off the so supplied error signal when the receiving line is active.

4. A transceiver as claimed in claim 1, characterized in that, responsive to the error signal, a bus transmission stage in the transceiver is switched to the inactive state.

5. A transceiver as claimed in claim 1, characterized in that the error signal is signaled external to the transceiver by means of an error line.

6. A transceiver as claimed in claim 1, characterized in that a control line is provided, whose activation resets the means for error management, switching the error signal to the inactive state.

7. A transceiver as claimed in claim 1, characterized in that the means for error management comprise a flip-flop which, in the set state, supplies the error signal.

8. A transceiver as claimed in claim 7, characterized in that the means for error management comprise a first AND gate whose output signal is applied to the flip-flop and which sets the flip-flop when the data bus lines are active and the receiving line simultaneously is inactive.

9. A transceiver as claimed in claim 2, characterized in that the timer circuit sets a flip-flop when the transmission line is active for a longer period than a predetermined time interval.

10. A transceiver as claimed in claim 8, characterized in that a second AND gate is provided whose inputs receive signals from the receiving line and the transmission line and which resets the flip-flop and thus switches the error signal to an inactive state when the transmission line is inactive and the receiving line is active.

11. A transceiver as claimed in claim 1, characterized in that said error signal has the effect that the transceiver no longer acts actively on the data bus.

12. A transceiver as claimed in claim 1, characterized in that means for error management comprise a timer circuit which triggers an error signal when the transmission line is active for a longer period than a predetermined time interval, which error signal is cancelled when both the transmission line is inactive and the receiving line is active.

13. A transceiver as claimed in claim 5, characterized in that the error signal is signaled external to the transceiver to an application having priority over the protocol controller.

14. A transceiver as claimed in claim 2, characterized in that the predetermined time interval is in accordance with a minimal time interval ensured by the data bus protocol for an inactive state of the data bus.

15. A transceiver for a serial data bus having data bus lines, the transceiver coupled to a protocol controller via a transmission line and a receiving line, the transmission line carrying a signal generated from the protocol controller indicative of data bus protocol respecting a writing process on the data bus lines, and the receiving line carrying a signal indicative of activity on the data bus lines, the transceiver comprising:

error management logic that monitors the signals of the transmission line and receiving line, the error management logic including determination logic that, responsive to the monitored signals, determines whether the data bus lines are in one state when the receiving line simultaneously signals the bus is in an opposite state, and the error management logic including signal logic that, responsive to said determination, provides an error signal.

16. A transceiver as claimed in claim 15, wherein the signal logic generates an active error signal responsive to the determination logic determining that the data bus lines are active when the receiving line simultaneously is inactive.

17. A transceiver as claimed in claim 16, wherein the signal logic generates an inactive error signal responsive to the determination logic determining that the transmission line is inactive and receiving line is active.

18. A transceiver as claimed in claim 16, further comprising a timer, the timer generating a timer signal responsive to the transmission line being active for a time period that is longer than a predetermined time interval, and wherein the signal logic, responsive to said timer signal, provides an error signal.

19. A transceiver as claimed in claim 18, wherein the timer generates the timer signal responsive to the transmission line being active for a time period which is longer than a predetermined time interval that is in accordance with a time interval ensured by the data bus protocol for an inactive state to arise on the data bus.

20. A transceiver as claimed in claim 18, wherein the signal logic generates an active error signal responsive to the timer signal indicating that the predetermined time interval is exceeded.

* * * * *